United States Patent
Kohler

(10) Patent No.: US 9,880,547 B2
(45) Date of Patent: Jan. 30, 2018

(54) NUMERICAL CONTROL

(75) Inventor: Frieder Kohler, Lauter (DE)

(73) Assignee: DR. JOHANNES HEIDENHAIN GMBH, Traunreut (DE)

(*) Notice: Subject to any disclaimer, the term of this patent is extended or adjusted under 35 U.S.C. 154(b) by 0 days.

(21) Appl. No.: 13/353,848

(22) Filed: Jan. 19, 2012

(65) Prior Publication Data

US 2012/0181969 A1 Jul. 19, 2012

(30) Foreign Application Priority Data

Jan. 19, 2011 (DE) .......... 10 2011 002 850
Dec. 19, 2011 (DE) .......... 10 2011 089 014

(51) Int. Cl.
G05B 19/414 (2006.01)
G06F 19/00 (2011.01)

(52) U.S. Cl.
CPC .. *G05B 19/414* (2013.01); *G05B 2219/34094* (2013.01); *G05B 2219/34202* (2013.01)

(58) Field of Classification Search
USPC .. 700/13, 28, 33, 56, 73, 80, 150, 159, 170, 700/173, 174, 178, 186, 189, 195, 275
See application file for complete search history.

(56) References Cited

U.S. PATENT DOCUMENTS

| | | | | |
|---|---|---|---|---|
| 3,882,304 A | * | 5/1975 | Walters | 700/163 |
| 5,402,367 A | * | 3/1995 | Sullivan et al. | 703/6 |
| 5,453,933 A | * | 9/1995 | Wright | G05B 19/414 700/181 |
| 6,400,998 B1 | * | 6/2002 | Yamazaki et al. | 700/86 |
| 6,907,313 B2 | * | 6/2005 | Matthews | G05B 19/4097 700/103 |
| 6,999,841 B1 | * | 2/2006 | Rutkowski | 700/181 |
| 8,024,068 B2 | * | 9/2011 | Gray | B25J 9/1602 382/153 |
| 8,676,354 B2 | * | 3/2014 | Forster | 700/19 |
| 8,688,258 B2 | * | 4/2014 | Miller | G05B 19/414 700/159 |
| 2005/0137739 A1 | * | 6/2005 | Yoshida et al. | 700/170 |
| 2007/0038328 A1 | * | 2/2007 | Endou | G05B 19/408 700/170 |
| 2008/0004744 A1 | * | 1/2008 | Heinemann | G05B 19/0426 700/173 |

(Continued)

FOREIGN PATENT DOCUMENTS

DE 103 11 026 9/2004
EP 1 755 009 2/2007

(Continued)

*Primary Examiner* — Eduardo Colon Santana
*Assistant Examiner* — Said Bouziane
(74) *Attorney, Agent, or Firm* — Andrews Kurth Kenyon LLP

(57) ABSTRACT

A numerical control for operating a machine tool having a plurality of axes, includes a drive controller for each axis to be actuated, the drive controllers being able to be parameterized via machine parameters and thus adaptable to the most varied applications. Variable control values and machine parameters are selectable via tapping points in the drive controllers in order to be used as arguments or parameters of a user-defined function for calculating an output value, which is used for function-dependent influencing of one of the drive controllers.

14 Claims, 3 Drawing Sheets

(56) References Cited

U.S. PATENT DOCUMENTS

| | | | | |
|---|---|---|---|---|
| 2008/0058984 A1* | 3/2008 | Gray | ............... | G05B 19/4069 |
| | | | | 700/192 |
| 2011/0166693 A1* | 7/2011 | Nishibashi | ......... | G05B 19/4103 |
| | | | | 700/187 |
| 2012/0095599 A1* | 4/2012 | Pak | ................. | B25J 9/1664 |
| | | | | 700/275 |

FOREIGN PATENT DOCUMENTS

| | | |
|---|---|---|
| EP | 1 818 744 | 8/2007 |
| WO | 2006/029994 | 3/2006 |

\* cited by examiner

NUMERICAL CONTROL

CROSS-REFERENCE TO RELATED APPLICATIONS

The present application claims priority to Application No. 10 2011 002 850.1, filed in the Federal Republic of Germany on Jan. 19, 2011, and to Application No. 10 2011 089 014.9, filed in the Federal Republic of Germany on Dec. 19, 2011, each of which is expressly incorporated herein in its entirety by reference thereto.

FIELD OF THE INVENTION

The present invention relates to a numerical control, e.g., as it is commonly employed for actuating the drives of a machine tool.

BACKGROUND INFORMATION

Numerical controls are used in a variety of types of machines and must therefore be adaptable to the individual machine as best as possible.

A numerical control must be able to actuate machines which have a plurality of movable axes. For example, machine tools for machining in five axes are quite common, for which two pivot or angle axes are provided in addition to the three linear axes, in order to be able to process a workpiece in a single clamping from all sides.

For each drive of such a machine, the control must have a separate drive controller, whose task consists of moving the particular axis according to a parts program.

For this purpose the so-called interpolator outputs a position setpoint value to the drive controller. FIG. 1 is a block diagram of a conventional drive controller for an axis. The deviation of the actual position value xact from the setpoint position value xnom is forwarded to a position controller, which forms a speed or rotational speed setpoint value wnom, by multiplying the deviation with an amplification factor Kv. The speed setpoint value wnom is processed in speed controller 2. The output of speed controller 2 is forwarded as current setpoint value Ignom to a current controller 3, via which motor 4 of the axis is ultimately actuated. Current actual value Iquact, speed actual value wact, and position actual value xact are used in a conventional manner for closing the cascading control circuits.

In order to allow a more rapid response to changes in the position setpoint value, a feedforward control unit 1 implements a feedforward control of the rotational speed (or speed) and current, while bypassing the individual controller. In this context, differentiators D are used to determine the first and second derivation of position setpoint value xnom, which are forwarded, as vnom and anom, respectively, to speed controller 2 and current controller 3.

Filters v-Flt, I-Flt, U-Flt, FIR with whose aid undesired resonances are able to be damped, may be acting at quite different locations in the drive controller.

As illustrated, a control circuit is adjustable via numerous parameters. For example, amplification factors Kp, Ki, Kd of the P-, I- and D-components of the different control circuits are stored in the control as machine parameters. The same applies to time constants Tt or the frequency response characteristics of the filters. Machine parameter MP, by which the second derivation of position setpoint value xnom is multiplied prior to being fed forward to current controller 3, is another example of such an adjustable parameter.

All of these settings are undertaken by the manufacturer of a machine tool in order to optimally adapt the numerical control to the machine tool. Parts programs are intended to produce dimensionally correct workpieces with clean surfaces as quickly as possible.

SUMMARY

Example embodiments of the present invention improve the parameterization of a numerical control and, in particular, its drive controllers, and provide improved possibilities for adapting the numerical control to a machine tool.

Example embodiments of the present invention provide for the greatest possible accessibility to the variables used in a drive controller, such as machine parameters and variable control values (setpoint variables, actual variables, auxiliary variables such as pilot control currents etc.) so as to allow their use as parameters and arguments of a user-defined function. With the aid of this function it is then possible to calculate output values which may be used for the most varied purposes.

For example, the output values may be fed into the drive controller in additive or multiplicative manner, or also as mathematical convolution at a feedforward point. For example, a geometry error of a machine produced by location-dependent bending of a support may have occurred. If the current position of this axis is entered as argument in a suitable function for calculating the bending, then the output value may be used to induce a compensatory motion, which eliminates the geometry error.

As an alternative, the output value may also be supplied to an additional user-defined function, as parameter or argument. This linking of user-defined functions allows the formation of complex functions from a set of simple functions.

Moreover, an output value may also be used to vary a basically fixed machine parameter, such as a function of location. The latter may be important if, for instance, a tool is moved across an X-Y plane and the machine tends to oscillations in certain areas of this plane. Certain amplification factors in these areas are then adaptable, to the effect that mechanical resonances of the machine tool do not lead to instabilities of the drive controller. No such adaptation is required in the remaining areas; there, positioning is able to take place more rapidly and/or precisely due to other parameters. This allows the machine to work in optimal manner in every working point, and the machine need not be parameterized to the worst working point.

A function is advantageously able to be selected from a set of functions. This makes it possible to implement the required inputs for the parameter settings via an editor, by mouse click, without any deeper programming knowledge.

It may be provided to specify limit values for the output value of a function. This prevents the use of excessively high output values, which exert an excessive influence on the drive controller or on a machine parameter. For example, a range of 0.9 to 1.1 may be specified for an output value that is fed forward in multiplicative manner. The quantity to be influenced in the drive controller then changes by no more than 10 percent.

The selection of the control variables may take place via pointers to tapping points in the drive controllers. For example, in addition to selecting the function, the parameters and arguments, too, are selectable in an editor, by mouse click. The same also applies to fixed machine parameters to be taken into account, or to simple constants, used for scaling the output value, for example.

The functions may also be able to act across a plurality of drive controllers, so that, for instance, errors by mechanical linking of different axes are able to be compensated in this manner. After all, it is quite possible that the tapping points for the parameters and arguments of a function may be located in a different drive controller than the feedforward point of the output value. As a result, an axis, for instance, is able to be influenced as a function of the state of a totally different axis, and this may be done utilizing all the possibilities offered by considering random functions with random input quantities when calculating the output value.

That is to say, example embodiments of the present invention considerably expand the possibilities for setting parameters of a numerical control, and it offers additional options, especially in the consideration of linked axes.

Further features and aspects of example embodiments of the present invention are described in more detail below with reference to the appended Figures.

DETAILED DESCRIPTION

Figure 1:
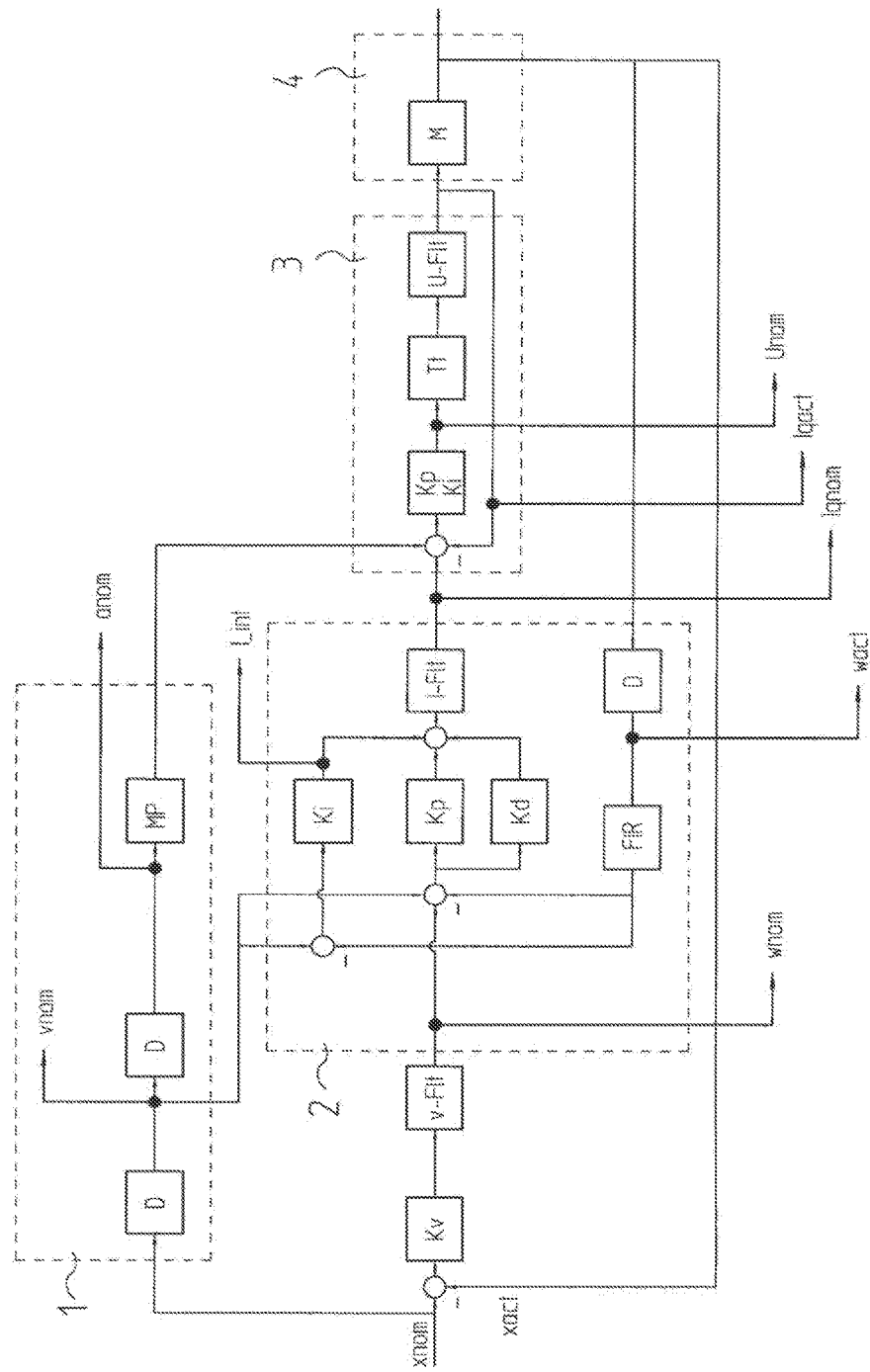
FIG. 1 is a block diagram of a drive controller having tapping points.

FIG. 1, discussed above, shows a drive controller for an axis of a machine tool. Numerous tapping points wnom, wact, iqnom, iqact, Unom, vnom, anam., I_int for temporally variable control values are illustrated, which are available in an editor, for example, for generating user-defined functions, Examples of such variable control values are the setpoint and actual values of position xnom, xact, and of speed wnom, wact of the particular drive, or currents Iqnom, Iqact, and voltages Unom in the motor. However, fixed variables such as amplification factors Kp, Ki, Kd and other machine parameters MP, Tt may also be values for consideration in a user-defined function.

Figure 2:
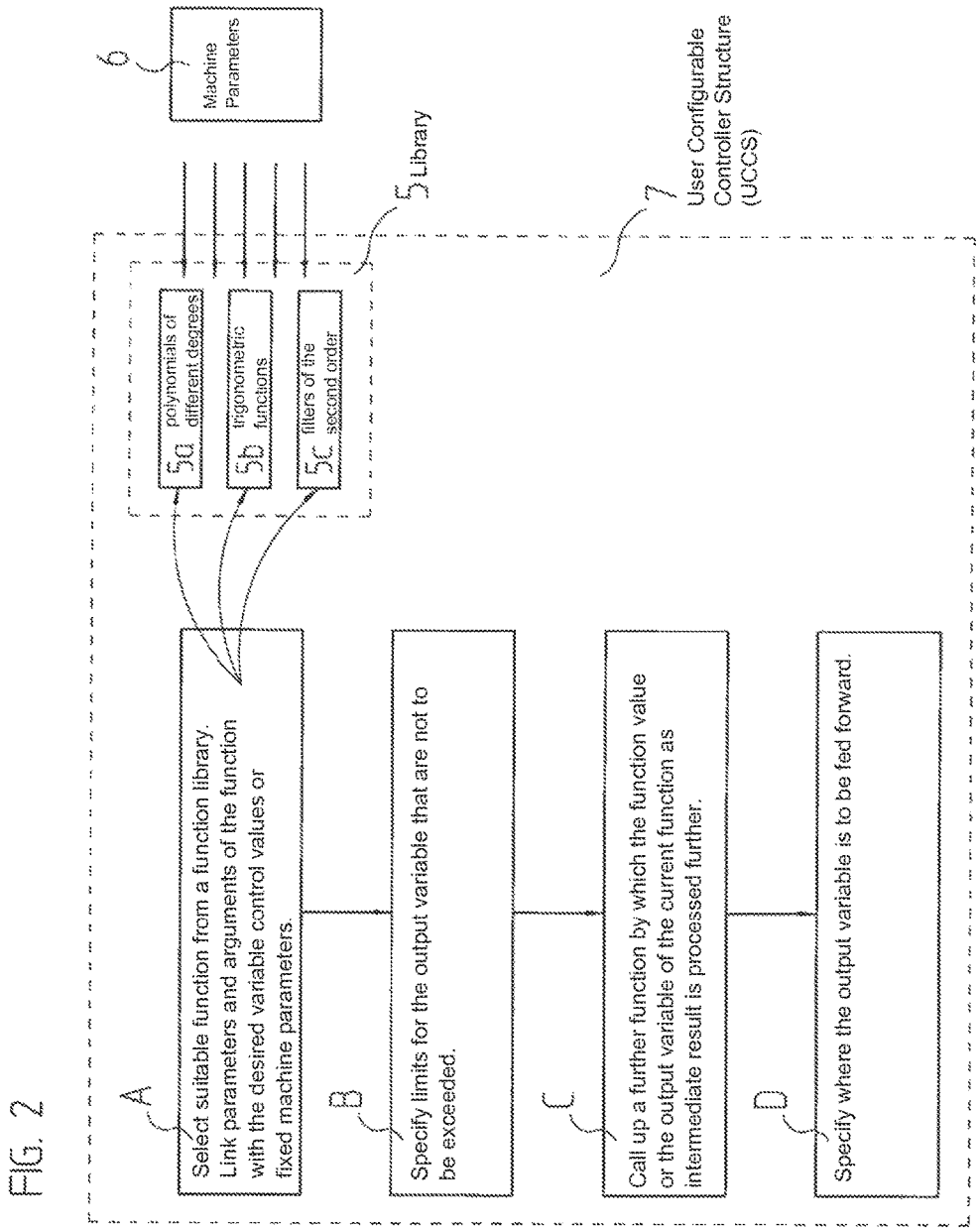
FIG. 2 is a block diagram illustrating defining a user-defined function.

FIG. 2 shows a block diagram for defining a user-defined function with the aid of a UCCS block 7 (User Configurable Controller Structure). As mentioned, it is beneficial if the actual function is selectable from a function library 5. This library 5 includes, for example, polynomials of different degrees 5a, trigonometric functions 5b, or also filters of the second order 5c. As an alternative, however, it is also possible to work with a single polynomial of a higher order, with whose aid various functions are able to be approximated. The selection of suitable parameters and arguments for such a polynomial will then be quite complex, however.

Thus, a first step A for defining a user-specific function advantageously is the selection of a suitable function from a function library 5. Part of step A is also the linking of the parameters and arguments of the function with the desired variable control values or fixed machine parameters 6. Input values of the function may be various controller quantities and machine parameters from the control circuit, or fixed values for scaling, or also the output value of another UCCS block.

For example, for a square polynomial $Y=a0+a1*X+a2*X^2$ as the selected function, control variable X is to be the argument of the function, which is able to be linked to actual position xact of the drive in question. Coefficients a0, a1, a2 are to be the parameters of the square function. The parameters may be assigned to fixed machine parameters or also be input as numerical value.

If required, the limits for the output variable that are not to be exceeded are specified in an additional step B, as already explained earlier.

In a step C, there is also the possibility of calling up a further function by which the function value or the output variable of the current function as intermediate result is processed further. In this manner, it is possible to create more complex functions from simple functions taken from the function library, by linking simple functions.

Finally, it must be specified, in a step D, where the output variable (function value Y in the square polynomial example) is to be fed forward. For this purpose feedforward points are specified in the drive controller. Examples of such feedforward points are the setpoint values of position xnom, speed wnom, and current Iqnom. The feedforward type needs to be specified as well, as previously mentioned already. All of these steps are able to be completed by simple selection from a list of specified options. This makes it possible to incorporate a user-defined function in an especially uncomplicated manner. A simple but powerful tool for setting parameters of the numerical control is able to be offered to machine tool manufacturers.

Once all selections have been made, a complete UCCS block 7 is obtained. Its content is storable in a text file and able to be taken into consideration by the control. For this purpose, the output values are calculated in a rapid control cycle (high-speed controller interrupt). The UCCS block 7 defines the user-specific function in its totality.

A user-defined function means, for example, that the user or operator (normally the manufacturer of the machine tool who adapts a control to his machine tool) is able to assign meaningful values from the drive controllers to the arguments and parameters of the function, as a minimum. Even the function itself is advantageously selected accordingly by the user. The specification of the limits and the feedforward point for the output values is likewise user-defined in this context.

Figure 3:
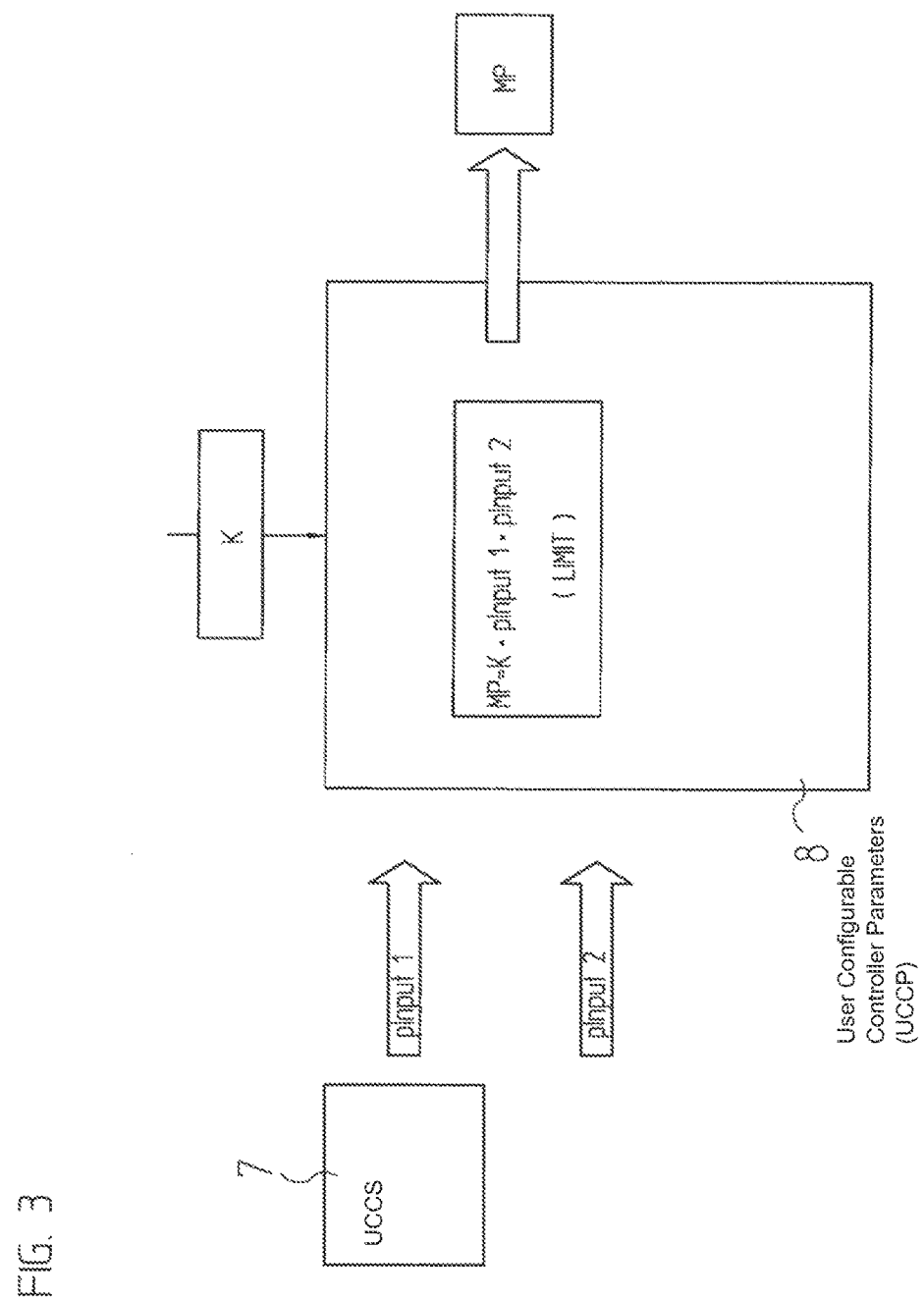
FIG. 3 is a block diagram illustrating influencing machine parameters.

FIG. 3 indicates an additional, previously mentioned possibility for using the output value of a user-specific function. For example, a machine parameter MP is quite easily able to be recalculated in that it is generated as the product of two input variables pinput1, pinput2, one of which, for example, is the output value of a user-defined function. Furthermore, it is beneficial if a constant K is additionally able to be multiplied for scaling purposes, and if limit values LIMIT are specifiable for the parameter. When all selections have been made, a complete UCCP block 8 exists (user configurable controller parameters), with whose aid a machine parameter is able to be set. A UCCP block 8 requires considerably fewer user inputs and is able to be processed by a numerical control much faster than a UCCS block 7, so that it constitutes a simpler and faster alternative for simple linkages of two input variables pinput1, pinput 2 for forming an output variable MP.

What is claimed is:

1. A numerical control for operating a machine tool having a plurality of axes, comprising:
a drive controller for each axis to be actuated, the drive controller is configured to be parameterized via machine parameters and adaptable to a plurality of machine tools;
wherein variable control values and machine parameters are selectable at tapping points in the drive controllers in order to be used as at least one of (a) arguments and (b) parameters of a user-defined function to calculate an output value;

wherein the output value is adapted for function-dependent influence of one of the drive controllers by the variable control values and machine parameters selected at the tapping points in the drive controllers;

wherein the user-defined function is selectable from a plurality of functions included in a function library;

wherein the function library includes polynomials of different degrees, trigonometric functions and/or second-order filters;

wherein the output value is feedable back to a feedforward point in one of the drive controllers at least one of (a) in an additive manner, (b) in a multiplicative manner, and (c) by mathematical convolution; and wherein at least one tapping point for at least one of (a) an argument and (b) a parameter of the user-defined function is located in a different drive controller than the feedforward point.

2. The numerical control according to claim 1 wherein the output value of a first selected function of the function library corresponds to at least one of (a) an argument and (b) a parameter of a second selected function of the function library, so that a user-defined function is formed, which is a linkage of functions included in the function library.

3. The numerical control according to claim 1, wherein a machine parameter is determinable in accordance with the output value.

4. The numerical control according to claim 1, wherein a limit value is definable for the output value.

5. The numerical control according to claim 1, wherein tapping points for the user-defined function are located in different drive controllers.

6. The numerical control according to claim 5, wherein the user-defined function takes a mechanical linkage of different axes of the machine tool into account.

7. The numerical control according to claim 1, wherein the user-defined function takes a mechanical linkage of different axes of the machine tool into account.

8. The numerical control according to claim 1, wherein the user-defined function includes a mathematical function, the arguments and/or parameters corresponding to arguments and/or parameters of the mathematical function.

9. The numerical control according to claim 1, wherein the output value is adapted for user-defined-function-dependent influence of one of the drive controllers by the variable control values and machine parameters selected at the tapping points in the drive controllers.

10. A numerical control for operating a machine tool having a plurality of axes, comprising:
a drive controller for each axis to be actuated, the drive controller is configured to be parameterized via machine parameters and adaptable to a plurality of machine tools;
wherein variable control values and machine parameters are selectable at tapping points in the drive controllers in order to be used as at least one of (a) arguments and (b) parameters of a user-defined function to calculate an output value, the output value adapted for function-dependent influence of one of the drive controllers;
wherein the tapping points for the user-defined function are located in different drive controllers;
wherein the user-defined function is selectable from a plurality of functions included in a function library; and
wherein the function library includes polynomials of different degrees, trigonometric functions, and/or second-order filters;
wherein the output value is feedable back to a feedforward point in one of the drive controllers at least one of (a) in an additive manner, (b) in a multiplicative manner, and (c) by mathematical convolution; and
wherein at least one tapping point for at least one of (a) an argument and (b) a parameter of the user-defined function is located in a different drive controller than the feedforward point.

11. The numerical control according to claim 10, wherein the user-defined function includes a mathematical function, the arguments and/or parameters corresponding to arguments and/or parameters of the mathematical function.

12. A numerical control for operating a machine tool having a plurality of axes, comprising:
a drive controller for each axis to be actuated, the drive controller is configured to be parameterized via machine parameters and adaptable to a plurality of machine tools;
wherein each drive controller includes at least one tapping point at which a variable control value and/or machine parameter is readable in order to be used as at least one of (a) arguments and (b) parameters of a user-defined function to calculate an output value, the output value adapted for function-dependent influence of one of the drive controllers; and
wherein the user-defined function is selectable from a plurality of functions included in a function library; and
wherein the function library includes polynomials of different degrees, trigonometric functions, and/or second-order filters; wherein the output value is feedable back to a feedforward point in one of the drive controllers at least one of (a) in an additive manner, (b) in a multiplicative manner, and (c) by mathematical convolution; and
wherein at least one tapping point for at least one of (a) an argument and (b) a parameter of the user-defined function is located in a different drive controller than the feedforward point.

13. The numerical control according to claim 12, wherein the user-defined function includes a mathematical function, the arguments and/or parameters corresponding to arguments and/or parameters of the mathematical function.

14. A method for operating a machine tool having a plurality of axis using a numerical control including a drive controller for each axis to be actuated, the drive controller is configured to be parameterized via machine parameters and adaptable to a plurality of machine tools, comprising:
selecting variable control values and machine parameters at tapping points in the drive controllers;
using the variable control values and machine parameters as at least one of (a) arguments and (b) parameters of a user-defined function to calculate an output value adapted for function-dependent influence of one of the drive controllers by the variable control values and machine parameters selected at the tapping points in the drive controllers; and
feeding the output value back to a feedforward point in one of the drive controllers at least one of (a) in an additive manner, (b) in a multiplicative manner, and (c) by mathematical convolution;
wherein the user-defined function is selectable from a plurality of functions included in a function library;

wherein the function library includes polynomials of different degrees, trigonometric functions and/or second-order filters; and wherein at least one tapping point for at least one of (a) an argument and (b) a parameter of the user-defined function is located in a different drive controller than the feedforward point.

\* \* \* \* \*